(12) United States Patent
Kuru

(10) Patent No.: US 8,010,138 B2
(45) Date of Patent: Aug. 30, 2011

(54) ALTERNATE MOBILE NETWORK CELL SYNCHRONIZATION

(75) Inventor: Lauri Kuru, Espoo (FI)

(73) Assignee: Nokia Corporation, Espoo (FI)

( * ) Notice: Subject to any disclaimer, the term of this patent is extended or adjusted under 35 U.S.C. 154(b) by 509 days.

(21) Appl. No.: 11/893,144

(22) Filed: Aug. 15, 2007

(65) Prior Publication Data

US 2009/0047913 A1   Feb. 19, 2009

(51) Int. Cl.
H04B 15/00 (2006.01)

(52) U.S. Cl. .................... 455/502; 375/356; 375/357

(58) Field of Classification Search .................. 455/502, 455/503; 370/203–210, 350; 375/356, 357
See application file for complete search history.

(56) References Cited

U.S. PATENT DOCUMENTS

| | | | |
|---|---|---|---|
| 5,537,685 A * | 7/1996 | Matsuno | 455/502 |
| 5,784,368 A * | 7/1998 | Weigand et al. | 370/350 |
| 6,493,539 B1 * | 12/2002 | Falco et al. | 455/67.11 |
| 7,110,725 B2 * | 9/2006 | Kent | 455/85 |
| 2002/0054611 A1 * | 5/2002 | Seta | 370/503 |
| 2003/0203745 A1 * | 10/2003 | Chiang et al. | 455/561 |
| 2006/0061501 A1 * | 3/2006 | Sheng et al. | 341/155 |
| 2007/0177605 A1 * | 8/2007 | Benco et al. | 370/395.4 |

FOREIGN PATENT DOCUMENTS

| | | |
|---|---|---|
| EP | 1 393 473 | 3/2004 |
| WO | WO-94/28643 A1 | 12/1994 |

OTHER PUBLICATIONS

"Autonomous inter base station synchronization via a common broadcast control channel" Vehicular Technology Conference, 1994 IEEE 44th Stockholm, Sweden Jun. 8-10, 1994, New York NY ISA, IEEE, Jun. 8, 1994, pp. 1050-1054, XP010123236 ISBN.

"Network Synchronisation for UTRA TDD", A.P. Hulbert et al., IEEE 2001, pp. 2804-2807.

"TDD Synchronisation", TSG-RAN Working Group4 meeting #3, Tokyo, Japan Mar. 29-31, 1999, 5 pgs.

"Draft LS about TDD Synchronisation Methods", TSG-RAN working Group 3, meeting #6, Sophia Antipolis, France, Aug. 23-27, 1999, 7 pgs.

"Technical Specification Group Radio Access Netowrk; Synchronisation in UTRAN Stage 2 (Release 7)", 3GPP TS 25.402 V7.0.0 (Mar. 2006), pp. 1-48.

* cited by examiner

Primary Examiner — Edward Urban
Assistant Examiner — Golam Sorowar
(74) Attorney, Agent, or Firm — Harrington & Smith

(57) ABSTRACT

A host base transceiver station BTS derives a reference timing signal from a physical layer training signal (such as a preamble) received from a neighbor network node/BTS. Downlink transmissions are then synchronized to the derived reference timing signal. This may be used as a holdover timing mode, such as when the host BTS determines that synchronization from a primary source is no longer reliable. In an embodiment, a reference oscillator of the host BTS is phase locked to the derived reference timing signal. Variations include one or multiple such training signals from one or multiple neighbor BTSs, selecting one BTS when the primary synchronization mechanism fails for several BTSs in the same area, and how to phase lock the oscillator without dithering about the target frequency. Apparatus and computer programs are also detailed.

30 Claims, 4 Drawing Sheets

ALTERNATE MOBILE NETWORK CELL SYNCHRONIZATION

TECHNICAL FIELD

The exemplary and non-limiting embodiments of this invention relate generally to wireless communications systems and, more specifically, relate to maintaining synchronization of a base transceiver station BTS during a holdover mode when normal synchronization fails.

BACKGROUND

Various abbreviations that appear in the specification and/or in the drawing figures are defined as follows:
3GPP third generation partnership project
BTS base transceiver station
C/I carrier-to-interference (—ratio)
CINR C/I
DL downlink
FDD frequency division duplex
HO handover
ID identification
PHY physical layer or L1
PI-type type of PLL with proportional and integral branches in the loop filter
PLL phase locked loop
QoS quality of service
RNC radio network controller
RSSI received signal strength indication
SNR signal-to-noise-ratio
SS subscriber station (fixed or mobile)
TDD time division duplex
UL uplink
UMTS universal mobile telecommunications system
UTRAN UMTS terrestrial radio access network This invention is related to synchronization within a network when a primary synchronization mechanism fails. Signaling among different base stations/cells of a network are synchronized to some common source or common control signal in order to facilitate re-use of radio resources (frequencies, spreading codes) in the uplink and downlink and to facilitate handovers of mobile subscriber stations (user equipment or mobile stations/terminals), among other reasons. This is done generally by an external timing reference (global positioning satellite clock signal; control signalling from a higher network node, etc.). The individual subscriber stations under control of the cell/base station BTS use timing references from the BTS to maintain their own synchronization to that cell. This may be through a synchronization channel, timing references in other control signals, and the like.

Any network that runs in TDD mode must be synchronized in order to avoid interference between UL & DL directions. Also any network (TDD or FDD) that supports soft macro diversity must be synchronized (macro BTSs are transmitting the same PHY signal or receiving the same PHY signal for later combining). If one or multiple BTSs lose their synchronization to the common timing reference, then the network performance will usually be first impaired and finally the out-of-sync-BS possibly needs to shut down all DL transmissions in order to avoid producing interference to the rest of the network. The BS UL receiver may still continue operating, but UL macro diversity will most likely be unusable if BTSs are not synchronized.

When an external timing reference of a base transceiver station BTS fail (e.g., failure of the source, transmission medium, or internal failure of the synchronization procedure within the BTS), the BTS can operate with its internal timing reference oscillator until the oscillator stability falls outside a predetermined threshold after which accuracy is no longer guaranteed. This internal oscillator may be used to approximate synchronization to the network/external source. But since the internal oscillator is no longer corrected to the external timing source it can be expected to drift over time, and so this reliability threshold is often given by a pre-calculated timer value that is computed based on expected drift (quality of the reference oscillator), temperature, and a few other factors. Generally, a BTS that continues operation using its internal oscillator timing after it has lost the external synchronization reference is said to be in a 'holdover mode'.

A fairly serious problem exists when operating in the holdover mode, in that eventually a complete shutdown will be required once the pre-calculated timer value expires and the external timing source remains unavailable. This is because continued DL transmissions at least would tend to interfere with transmissions of other BTSs that may still be properly synchronized. So long as the BTS in question is synchronized to the external timing source or to its internal reference oscillator within the accuracy threshold, the BTS may continue to send DL transmissions. So extending the period during which a BTS may operate in the holdover mode addresses the problem of avoiding (or at least minimizing) BTS shutdown for lack of sufficiently accurate synchronization to the network. For example, if the holdover mode can be extended indefinitely, then the BTS would never need to shut down due to failure of primary synchronization mechanism.

The loss of synchronization has been addressed in the prior art by several different approaches. The prior art solutions typically take one of two approaches. The first approach uses a secondary external reference clock source (e.g. from GPS-based sync to E1-based sync feed). For TDD-mode, 3GPP specifies in TS 25.402 an over-the-air synchronization method whereby the BTS references specialized synchronization bursts and protocols. The second approach relies on determining the accuracy of the BTS's internal crystal oscillator. When the synchronization reference is lost, the voltage control of the internal oscillator is frozen to the current value. By examining the oscillator's short time stability & aging specifications and its sensitivity to external factors (like temperature, supply voltage stability, control voltage stability) a time limit is defined after which it can not be guaranteed that the BTS timing is good enough to avoid interfering with transmissions in other cells of the network. At this point the DL transmissions from the suspect BTS must be switched off.

The problem is that when an internal fault occurs within the suspect BTS whereby it can no longer synch to the functioning external common reference clock, a secondary external reference clock is likely to also be unusable for that suspect BTS. The other approaches are seen to potentially maximize the time by which the internal reference clock may be used for DL transmissions at least, but necessarily the internal oscillator will drift beyond the minimum guarantee of accuracy. In both instances the suspect BTS will need to be shutdown, at least for DL transmission, causing major disruptions in network access and coverage until repairs are made. What is needed is another backup synchronization method and apparatus to extend synchronization with the network beyond the accuracy of the internal oscillator.

SUMMARY

In accordance with one embodiment of the invention is a method whereby at a host network is derived a reference timing signal from a physical layer training signal received from a neighbor network node. Downlink transmissions are synchronized to the derived reference timing signal.

In accordance with another embodiment of the invention is an apparatus that includes a receiver, a processor and a transmitter. The receiver is adapted to receive a physical layer training signal from a neighbor network node. The processor is adapted to derive a reference timing signal from the received physical layer training signal. The transmitter is adapted to send downlink transmissions synchronized to the derived reference timing signal.

In accordance with another embodiment of the invention is a computer readable memory embodying a program of machine-readable instructions executable by a digital data processor to perform actions directed toward synchronizing with a network. In this embodiment, the actions include deriving a reference timing signal from a physical layer training signal received from a neighbor network node, and synchronizing downlink transmissions to the derived timing signal.

In accordance with yet another embodiment of the invention is an apparatus that includes means for receiving a physical layer training signal from a neighbor network node. It also includes processing means for deriving a reference timing signal from the received physical layer training signal. The apparatus further has means for transmitting downlink transmission synchronized to the derived reference timing signal. In a particular embodiment of this aspect, the means for receiving includes a receiver, the processing means includes a digital data processor, the means for transmitting is a transmitter, and there is further a timing means for synchronizing the transmitter to the reference timing signal embodied as a reference oscillator phase locked to the reference timing signal.

These and other aspects and embodiments are detailed more fully below.

BRIEF DESCRIPTION OF THE DRAWINGS

Embodiments of the invention are detailed below with particular reference to the attached drawing Figures.

DETAILED DESCRIPTION

Consider the problem outlined in the background section as resulting from three possible causes: 1) one BTS loses its synchronization reference; 2) many but not all BTSs in a given area lose their synchronization source (e.g. GPS sync fails due to radio wave propagation conditions); and 3) all BTSs in a given area lose their synchronization source (e.g. sync may be fed to the network from a single point which fails, or GPS sync fails due to radio wave propagation conditions). In each of these the solution lies in how to maximize the duration of holdover mode. If the holdover mode can be extended indefinitely, then the BTS would never have to shut down due to failure of the primary (external) synchronization mechanism. If the holdover mode can be extended indefinitely, then such a holdover mode mechanism may also be used as a primary synchronization mechanism in other types of networks. In that regard, embodiments of this invention provide an 'alternate' synchronization, alternate to the primary for the case where these embodiments are used as a holdover mode synchronization mechanism, and alternate to other networks for the case where these embodiments are used as a primary synchronization mechanism. One environment in which such embodiments may serve as the primary synchronization mechanism is in a network having WiMAX repeater base stations (e.g., outdoors or indoors in homes, for example).

In broad terms and according to an embodiment of the invention, RF-power shutdown can be avoided completely if the BTS stops normal operation for a single frame (or a few frames in other embodiments) and checks its synchronization against other nearby BTSs. Several methods for doing this are possible and detailed below. So long as this allows sufficiently accurate synchronization performance, then RF-transmissions can continue indefinitely. The advantages are manifest: network/BTS operator service availability is increased, time to BTS shutdown becomes much less critical and may even be avoided completely (in the past this has been considered as a time-to-on-site-repair requirement), and the network operator maintains its network coverage and reliability for not dropping calls. As will be seen, this is at the (minimal) cost of slightly increased complexity in the BTS for implementing the embodiments detailed herein (generally a software implementation to upgrade existing BTSs), which are in the vein of a failsafe mode when the external or primary synchronization mechanism fails due to failure of the external source itself, of interference in receiving the signal from the source, or some internal fault in the suspect BTS whereby it cannot synch to the operational external source).

Figure 1:
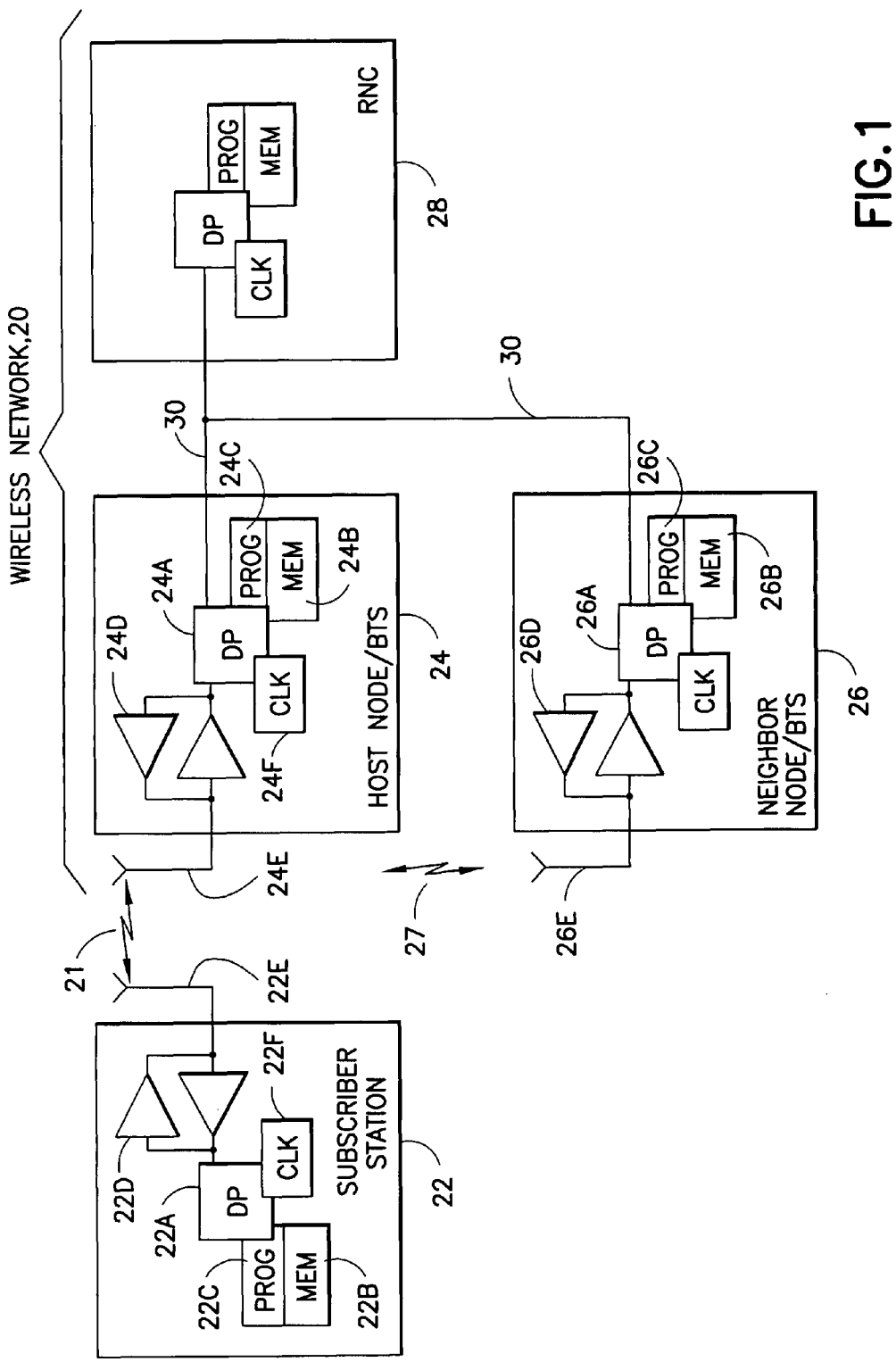
FIG. 1 shows a high-level schematic block diagram of a BTS according to an embodiment of the invention and an environment in which it operates.

Reference is now made to FIG. 1 for illustrating a simplified block diagram of various electronic devices that are suitable for use in practicing the exemplary embodiments of this invention. In FIG. 1 a wireless network 20 is adapted for wireless communication with a subscriber station SS 22 (which may be fixed or mobile) via a host network node/BTS 24. Also shown in a neighbor network node/BTS 26. It is noted that the SS 22 does not form a part of the network 20 (even in relay networks that use the SS 22 to relay to/from other SSs or network nodes); the network provides service/access to the UE 22. The network 20 may include a serving radio network controller RNC 28 or other radio controller function known by various terms in different wireless communication systems (e.g., mobility management entity MME, gateway, etc.). The SS 22 includes a data processor (DP) 22A, a memory (MEM) 22B that stores a program (PROG) 22C, and a suitable radio frequency (RF) transceiver 22D coupled to one or more antennas 22E (one shown) for bidirectional wireless communications over one or more wireless links 21 with the host node/BTS 24. The SS 22 synchronizes its transmissions and sleep periods with reference to a clock 22F, which is typically disposed on the DP 22A and slaved to reference timing signals send from the host node/BTS 24 over the wireless link 21.

Each of the host node/BTS 24 and the neighbor node/BTS 26 also include a DP 24A, 26A, a MEM 24B, 26B that stores a PROG 24C, 26C, and a suitable RF transceiver 24D, 26D (e.g., combined transmitter and receiver) coupled to one or more antennas 24E, 26E. Unlike the SS 22, the clocks/oscillators 24F, 26F of the nodes/BTSs 24, 26 are normally referenced to an external network synchronization signal (e.g., GPS), but synchronized to an alternate source according to the embodiments detailed below. Each of the nodes/BTSs 24, 26 may be coupled via a data path 30 (e.g., Iub or S1 interface) to the serving or other MME/RNC 28. The MME/RNC 28 includes a DP 28A, a MEM 28B that stores a PROG 28C, and a suitable modem and/or transceiver (not shown) for communication with either or both of the nodes/BTSs 24, 26 over the Iub link 30.

In certain wireless systems, frame preambles are sent with greater power than the frame body that carries user data. Among other advantages, this allows any SS 22 to determine neighboring BTSs for handover purposes. The neighbor node/BTS 26 is therefore defined for purposes of this disclosure as one from whom the host node/BTS 24 receives its preamble (generally but not exclusively the node/BTS of a cell adjacent to that of the host node/BTS 24). In an embodiment, the host node/BTS 24 therefore receives this preamble from its neighbor node/BTS 26 over another airlink 27, which will be on a channel controlled by the neighbor node BTS 26. In this manner communication between them is independent of the RNC 28. Note that this link 27 differs from a control link interface defined in other standards and protocols (e.g., X2 interface), and is the normal airlink 27 through which the neighbor node/BTS 26 communicates with those SSs it serves.

This description uses the neighbor preamble in the detailed examples, but as will be appreciated this is not a limit to the invention; a midamble, a postamble, or a pilot signal arrangement may be used as well. All these are meant for synchronizing the receiver's physical layer, and may be broadly grouped as physical layer training signals. Regardless of whether the specific implementation is preamble, training symbol, or otherwise, it will be understood that it may be necessary for the host BTS 24 to change channels to listen and receive its neighbor's physical layer training signals, and thereafter change back in order to use its updated timing reference for transmissions in its own cell.

At least one of the PROGs 24C and 26C of the network nodes/BTSs 24, 26 is assumed to include program instructions that, when executed by the associated DP, enable the electronic device to operate in accordance with the exemplary embodiments of this invention, as will be discussed below in greater detail.

The PROGs 24C, 26C may be embodied in software, firmware and/or hardware, as is appropriate. In general, the exemplary embodiments of this invention may be implemented by computer software stored in the MEM 24B and executable by the DP 24A of the network node/BTS 24 and similar for the other MEMs and DPs of the neighbor network node/BTS 26, or by hardware, or by a combination of software and/or firmware and hardware in any or all of the devices shown.

In general, the various embodiments of the SS 22 can include, but are not limited to, mobile stations, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 22B, 24B and 26B may be of any type suitable to the local technical environment and may be implemented using any suitable data storage technology, such as semiconductor-based memory devices, magnetic memory devices and systems, optical memory devices and systems, fixed memory and removable memory. The DPs 22A, 24A and 26A may be of any type suitable to the local technical environment, and may include one or more of general purpose computers, special purpose computers, microprocessors, digital signal processors (DSPs) and processors based on a multi-core processor architecture, as non-limiting examples.

Having described the environment and appropriate hardware/software for implementing the various embodiments of the invention, now those embodiments are detailed with specificity.

Consider the first problem cause noted above, where a single BTS 24 loses its external synchronization source for whatever reason. For the case where it is the sole network node/BTS 24 in the network 20, the problem is self-correcting in that there are no neighbors and so no need to synchronize with any other network nodes since there is no opportunity for DL transmission interference. Such a sole network node 24 can continue indefinitely using its internal reference oscillator with no loss of service to the SSs 22. But for the case with multiple network nodes/BTSs 24, 26 as in FIG. 1, an embodiment of the invention resolves loss of external synchronization as follows.

When the host network node/BTS 24 loses the external synchronization/primary synchronization mechanism, it continues normal operation by freezing the internal reference oscillator control voltage. This is known from previous solutions as noted above. Also as detailed above, there is a time period whereby this approach of continuing the pre-existing control voltage to the reference oscillator enables the host BTS 24 to continue with DL transmissions and normal transmissions. But in the present solution, whether immediately upon losing its synchronization or after some allowed DL transmissions with the static control voltage to the oscillator (but within the time period where the internal oscillator is still acceptable for network synchronization), the host BTS 24 foregoes transmission of one or several DL frames. Instead, during that time at which it was otherwise scheduled for DL transmission (scheduled either explicitly by its own scheduler or implicitly in that the SS 22 is expecting the host BTS 24 to send a DL transmission), it listens to/receives the preambles of its neighbor BTSs 24 and measures and records the timing phase of each received preamble. It may listen to one or more neighbor BTSs 26, and to one or more preambles from one or more of them (as detailed below), but at minimum one preamble from one neighbor BTS 26. A timing reference (referred herein as $T_{ref}$) is derived from these recorded measurements by properly filtering the received and detected timing phases. Filtering includes (a) selection of the reference BTS whose signal level is sufficient (either signal strength, CINR, or some other measure of signal quality) and (b) lowpass-filtering of the timing-phase.

Note that obtaining the synchronization signal itself involves no control signaling as do other prior art approaches (though some control signaling may be used to establish a network timing hierarchy if one does not already exist). The only cost in radio resources is the host BTS 24 foregoing one or more DL transmission frames in order to listen to its neighbor preambles.

Recall that if the backup synchronization mechanism can be continued indefinitely, the problem of a BTS 24 losing primary synchronization becomes much less acute for network operators. According to an embodiment then, this backup network synchronization is continued by the host BTS 24 periodically foregoing a DL transmission opportunity and again measuring the timing of the preambles of its neighbor BTSs 26, and subsequently tuning its internal oscillator 24F so that the preamble timings are phase-locked to $T_{ref}$ i.e. the timings measured earlier. $T_{ref}$ is updated with the newly measured timing phase. If the cause of failure of the primary synchronization mechanism in the host BTS 24 lies within the host BTS 24 itself, then the neighbor BTS 26 to which the host BTS 24 is now synchronized is itself synchronized to the network external reference and this solution by itself is sufficient in that the host BTS 24 can continue indefinitely with this backup synchronization mechanism, losing only a periodic DL opportunity when it measures neighbor BTS 26 preambles.

The case of multiple BTSs in an area/neighborhood losing their primary synchronization mechanism is more problematic, in that the host BTS 24 may synchronize to preambles of a neighbor BTS 26 that is itself also no longer synchronized to the external timing reference. For this cause there must be some timing hierarchy in the network 20. In this instance, each of the BTSs in question know independently that they've lost their primary timing source, but may not know which if any of their neighbor BTSs also lost it. For this case the same solution of synchronizing to a neighbor BTS preamble still functions properly, because of the hierarchy of timing in the network.

Now consider the case of several BTSs losing their primary synchronization mechanism but where the network is distributed (or at feast has a distributed architecture for network synchronization), and there is no pre-existing hierarchy by which timing is corrected. In this instance the above preamble timing phase approach detailed above is extended in that a single neighbor BTS is selected against which the other BTSs synchronize themselves.

Without any control-signaling any particular BTS losing its primary synchronization mechanism would not know which of its neighbor BTSs 24 have good synchronization and which do not. Choosing one as the proper synchronization reference where there is distributed synchronization architecture in the network then entails making a best guess, and ensuring that all the BTSs affected synchronize to the same neighbor BTS 26. For example, all affected BTSs may choose the fastest or slowest neighbor. One problem is that another out-of-sync BTS might be the fastest in the neighborhood and there remains at least one BTS in the neighborhood, running slower, which is synchronized to the normal external source. This would result in some BTSs following the fastest BTS while others would remain with their known good synchronization source. Similar to an approach detailed at 3GPP TS 25.402, an average timing from the neighborhood may be used. However, this also avoids an inherent problem in that of multiple neighbors, only one may be synchronized properly so averaging is not sufficient for guaranteeing performance. To address this potential issue TS 25.402 proposes using weight coefficients in the averaging. Effectively this means a synchronization hierarchy instead of distributed network synchronization, and so the solution above for using preambles will become effective since all BTSs will be weighing neighbor nodes similarly and eventually that with true synchronization to the external source will be given higher and higher weight factors.

Now consider the third problem cause noted above, where all BTSs in an area have lost their synchronization. The solution here is to artificially/arbitrarily select one node as the synchronization reference and freeze the control voltage to the reference oscillator in that selected BTS. Other BTSs will then phase-lock their timings to the reference BTS timing using the method described above for preamble timing phase measurements.

So long as there are no co-existence related TDD synchronization requirements (e.g. other operators at an adjacent channel with the same TDD timings & the same UL:DL ratio), then the network 20 can continue running in this mode indefinitely. In the case of a WiMAX network, it appears that operators who use the same band/sub-band must have their BTSs working with the same DL:UL-ratio and the same frame start phases. This means that in WiMAX networks, cell synchronization is required even between operators on adjacent channels, although the cell synchronization requirement between operators is relaxed by 1 . . . 1.5 decades (60 us instead of 1 us). Channel specific RF-filtering may be imposed in this situation of common UL:DL ratio and common sub-band.

If there are co-existence-related synchronization requirements, then it may be that the entire non-synchronized network 20 needs to stop operation when the reference oscillator accuracy does not guarantee interference-free operation for the co-existing networks. To avoid this, the affected network 20 could lock its timings to the timings of the co-existing and properly synchronized network. This presumes a pre-existing communication protocol for finding out if the co-existing network has good synchronization or not, which currently do not exist to the inventor's knowledge. If both networks simply try to lock their timings to each other without some pre-existing protocol to determine a master/slave type relation between them, instability is likely to follow and reference oscillators would eventually be driven to their minimum or maximum values. This becomes a problem if some BTSs in the network cannot tune their oscillators as much as the network's reference nodes can tune theirs.

Figure 2:
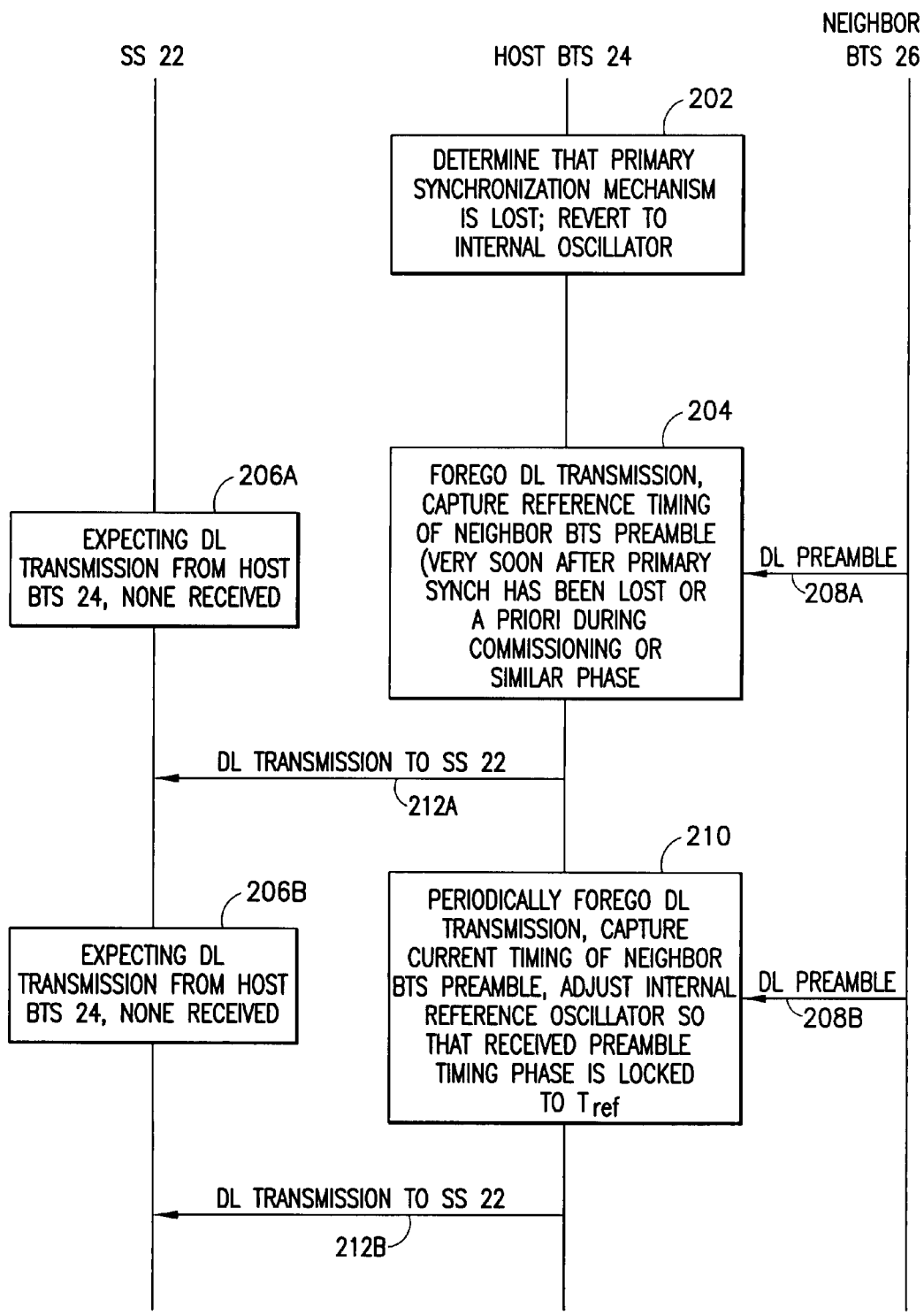
FIG. 2 is a signaling diagram including process steps by which the host BTS of FIG. 1 maintains synchronization to the network through the neighbor BTS according to an embodiment of the invention.

The above generalized solution is shown in the signaling diagram of FIG. 2, which also includes process steps that the host BTS 24 follows to maintain synchronization with the network through the neighbor BTS 26. At block 202 the host BTS 24 determines that its primary synchronization mechanism is lost, such as loss of a GPS signal, loss of some other external signal used for network synchronization, inability to correctly decode or process that external signal, or the like. As noted in the prior art, the host BTS 24 then reverts to using its internal oscillator to temporarily keep network synchronization, such as by retaining the last control voltage to the oscillator. Also as noted above, this alone is a very time-limited solution. At block 204 the host BTS 24 foregoes a DL transmission and captures reference timing ($T_{ref}$) of a neighbor BS preamble (e.g., very soon after primary sync has been lost or a priori during commissioning or a similar phase). The host BTS 24 may listen to one preamble 208A from one neighbor BTS 24, multiple preambles from that same neighbor BTS 26, a single preamble from multiple neighbor BTSs, or multiple preambles from multiple neighbor BTSs. During that foregone DL transmission opportunity, the SS 22 expects at block 206A (and later at block 206B) to receive a DL transmission form the host BTS 24 (which is the serving cell of the SS 22) but receives none because the host BTS 24 is instead tuned to receive the preamble. The host BTS 24 knows the correct frequencies and timeslots for those neighbor BTS preambles because it keeps a list of neighbor BTSs 26 in its local memory 24B for handover purposes (as detailed below in the WiMAX specific implementation), which it accesses for the purposes of this embodiment.

Message 208A (and 208B) is the preamble from the neighbor BTS 26 that the host BTS 24 receives. In an embodiment, the host BTS 24 records the timing phase of the received preamble(s), and derives from them the reference timing signal $T_{ref}$. The host BTS 24 phase locks its local reference oscillator 24F to the determined reference timing signal $T_{ref}$, such as via a modified PLL detailed further below. With that phase-locking the local reference oscillator 24F of the host BTS 24 is now slaved to the network timing, and sends its next DL transmission 212A to the SS 22. At block 210 the host BTS 24 periodically foregoes a DL transmission, captures current timing of a neighbor BTS preamble 208B, and adjusts its internal reference oscillator so that the received preamble timing phase is locked to $T_{ref}$. Using that locked timing the host BTS 24 transmits a DL message 212B to the SS 22.

Note that the particular steps of determining loss of primary synchronization and deriving $T_{ref}$ from the neighbor preamble may be done in the reverse order. The reference timing phase signal could be captured a priori during commissioning or during normal network operation, or in an ad-hoc style when needed. Best options would be at commissioning time or when needed. For example, a loss of primary synchronization is detected, and very soon after that the reference timing is captured from neighbor BTS preamble (no timing adjustment is done at this point). After this, the host BTS 24 in the holdover mode will periodically measure neighboring BTS preamble timing phase (either the same or others depending on how neighbor BTS is selected) and compare it to the reference phase last taken. Then the host BTS 24 makes a correction in its own reference timing circuit (e.g., keeps it phase-locked).

Figure 3:
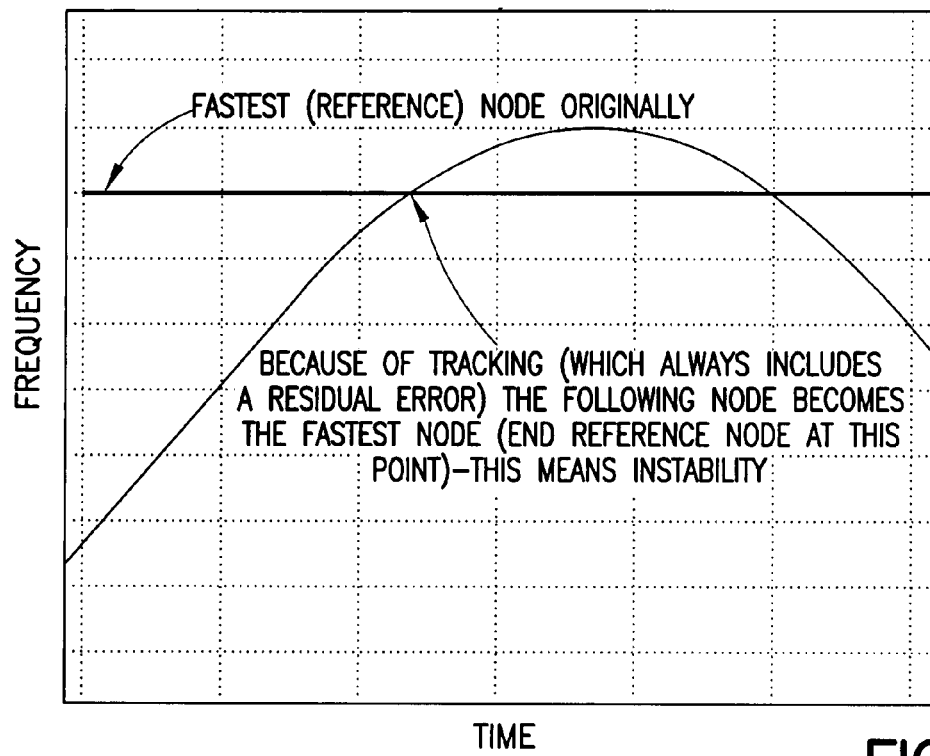
FIG. 3 is a frequency versus time diagram showing tracking behavior of a normal phase locked loop, demonstrating system instability risk in case of distributed synchronization architecture.
Figure 4:
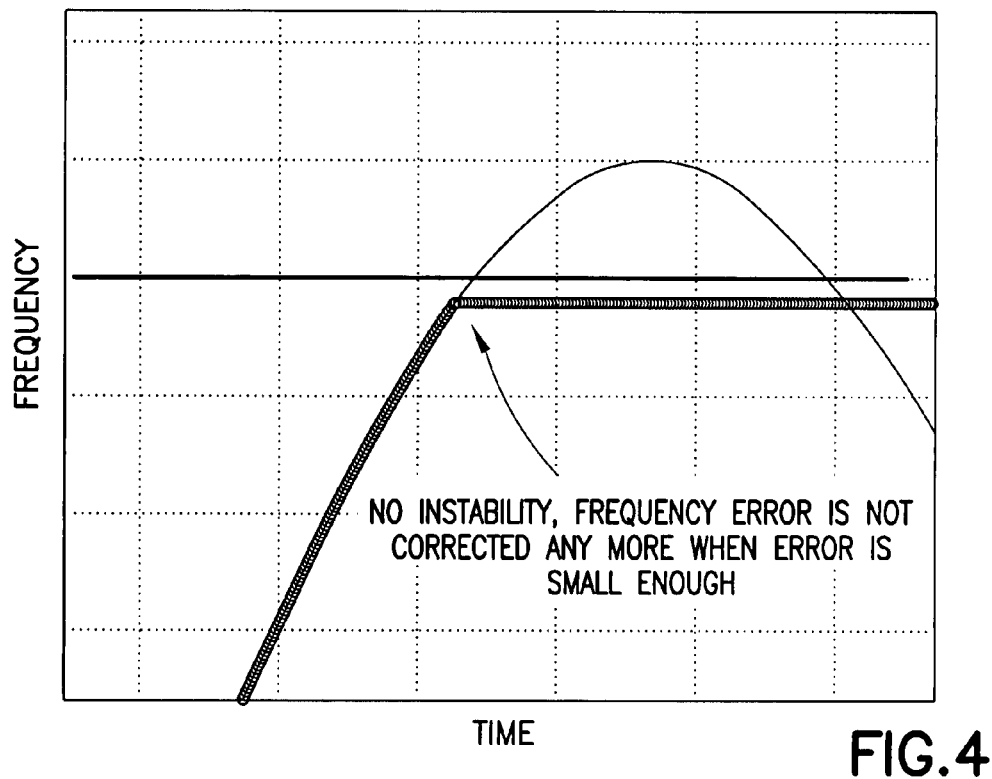
FIG. 4 is similar to FIG. 3, but with the PLL modified according to an embodiment so that the tracking loop is updated only when frequency error exceeds a pre-determined threshold, resulting in more stable synchronization to the network.

Now is described an alternative solution to the case where all BTSs in a network neighborhood lose their primary synchronization source, also valid for a network that is being set up without any external synchronization reference (which implies that there can not be any co-existence related timing requirements). If there are no co-existence-related timing requirements, then the network 20 may also use a distributed synchronization architecture so that all nodes phase-lock their timings to the fastest (or slowest) running BTS oscillator in the neighborhood using the method described above, where no control-signaling is needed for the back-up synchronization. In this alternative, a modified PLL is employed. In the case of distributed synchronization, a traditional (PI-type) PLL leads to instability. See FIG. 3, which shows a frequency-time plot for a traditional PLL. Any $2^{nd}$ order PLL or equivalent—be it feedback or feedforward type—would implement in some form phase error estimation, phase error compensation, frequency error estimation and frequency error compensation. A modified PLL will update its frequency error estimate with a fraction (0<fraction<1) of the detected remaining frequency error, but only when the detected frequency error (phase error/time interval) exceeds a pre-determined threshold. If the frequency error does not exceed that threshold, then the frequency error should not be fully compensated. This guarantees that after the frequency correction the reference oscillator with the highest frequency is still in the same node/BTS where it used to be. See FIG. 4, which shows a frequency-time plot for a PLL modified to only correct when frequency offset exceeds a pre-determined threshold. Implementation is by adding a threshold condition check to a frequency error estimation portion of the PLL so as to impose the frequency error threshold. This enables a stable synchronization for a network 20 with a distributed synchronization architecture.

Figure 5:
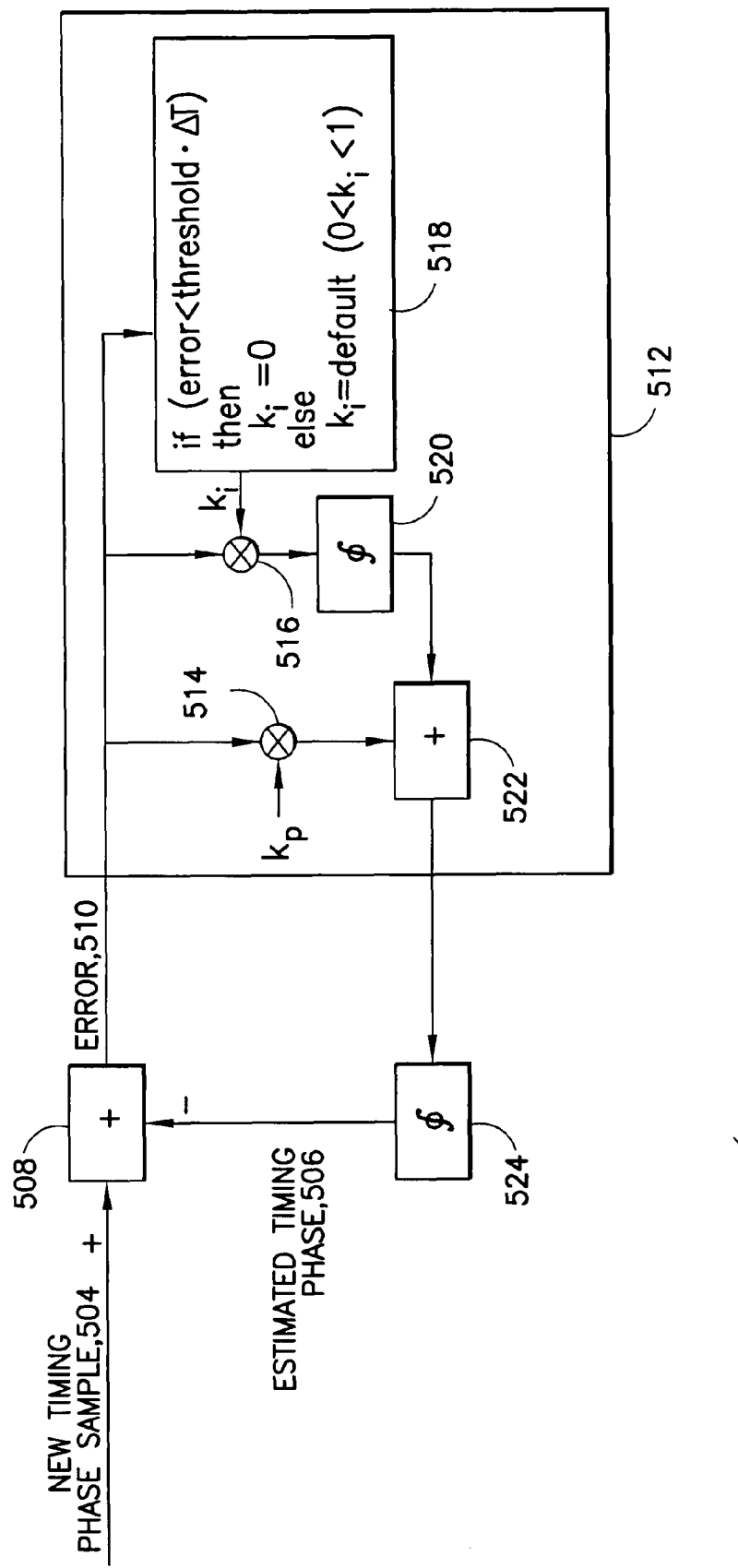
FIG. 5 is a schematic block diagram of an exemplary PLL modified according to an embodiment of the invention.

FIG. 5 is a schematic block diagram showing one simple implementation of such a modified PLL 502. A new timing phase sample 504 is input, such as may be derived from a neighbor BTS's preamble. An estimated timing phase 506 from the PLL 502 is input to an adder 508 and the difference is output as a timing error 510 into both a proportional branch and an integral branch of the loop filter 512. The proportional branch is conventional; a proportional branch gain $k_p$ is input to a p-branch multiplier 514 which amplifies the error 510. The integral branch is modified. Conventionally, an integral branch gain $k_i$ is input to an i-branch multiplier 516 which also amplifies the error 510 (the I-branch gain $k_i$ is between zero and one). That is also how this PLL 502 operates when the error 510 exceeds some pre-determined threshold, such as may be determined from the behavior of FIGS. 3-4. But when the error is less than that pre-determined threshold, then the gain $k_i$ applied at the I-branch multiplier 516 is driven to zero (or ground, depending upon digital or analog implementation). This condition may be implemented at block 518 by control logic such as a comparator, a simple filter, or a simple switch controlling whether k, or ground are input to the i-branch multiplier 516. The threshold may be adapted based on time since last measurement cycle (the previous sample 504 input to the PLL 502), as box 518 illustrates. The remainder of the PLL 502 is conventional; the output of the second multiplier 516 is integrated at an analog (e.g., capacitor) or a digital integrator 520 and then summed with the amplified error from the p-branch at adder 522, and from that a phase estimator 524 outputs the estimated timing phase 506 back to the adder 508. So by zeroing the gain $k_i$, the integral branch is effectively rendered null for those times when the error 510 is less than the threshold, removing any residual error and eliminating the instability seen at FIG. 3.

It is understood that FIG. 5 is exemplary; there are numerous and varied way to modify a conventional PLL to suppress residual error and stabilize the frequency tracking.

Specific to WiMAX networks, there is a unique preamble for each BTS (there are 113 preamble sequences) within a neighborhood. In WiMAX a BTS must broadcast neighboring BTS information to the SSs 22 for the purpose of making it easier for the mobile SSs 22 to search for a target BTS for handovers. Therefore each BTS knows its own neighbors, so the host BTS 24 which lost its primary synchronization mechanism can use this stored neighbor BTS information for purposes of scanning for neighbor preambles.

WiMAX is an OFDM(A) based system, so it naturally tolerates some timing errors (up to 10 us, roughly the duration of OFDMA guard interval in WIMAX) with graceful performance degradation. When the timing offset increases, the tolerance decreases for multipath propagation timing spread. If timing offsets exceed about 10 us, then the system performance is very much implementation dependent (mostly depending on implementation at the SS 22). At timing offsets of about 60 us (the radio/modem turnaround time in WiMAX), there will be a direct transmit/receive-interference with neighboring BTSs and SSs.

When there are multiple BTSs per site, typically there will be a common timing reference used for all BTSs. This implies that all BTSs on a site should be listening at the same time. If multiple BTSs lose their primary synchronization at once, then they would all be foregoing their downlink frame at the same time and each listening for a preamble from one another. If there is a common network time, then the listening intervals can be selected in such a way that in the network (or neighborhood) only one BTS at a time will be skipping the DL frame transmission due to listening to neighbor BTSs. Keeping with the general concept of avoiding control signaling to deal with this synchronization problem, this also can be addressed without centralized instructions. In this variation, each BTS computes its own listening slot based on an identifier that is unique within the neighborhood, such as cell identifier. Consider an example where the network time is based on frame numbers. The listening frame numbers for an individual BTS for this backup synchronization mechanism may be computed based on the BTS's cell ID, such as in the sample equation below:

(cell_ID modulo 100)×10≦frame_number<(cell_ID modulo 100)×10+10

This allows ten frames of consecutive listening for each BTS. One cell_ID is selected per site for the computation. Alternatively, the listening slots may be artificially defined across the network and stored in memory of the BTS as a contingency for use in the holdover mode.

Due to the relatively tight cell timing requirements of WiMAX, it appears that in practice only GPS provides a sufficiently precise timing reference at a reasonable cost. This means that equipment failure and propagation conditions can both be root causes for synchronization failure. The WiMAX standard currently requires that a BTS use a common reference oscillator for generating both timing and RF frequencies. OFDM(A) frequency synchronization can thus be guaranteed automatically when timing between BTSs are synchronized as in the embodiments detailed above. At least in WIMAX, the solution above where one BTS obtains a timing advance from the neighbor BTS as if it were an SS is seen to be somewhat limited by link budget, which is more demanding in this case since an actual remote signal must be received instead of simple & robust preamble cross-correlation.

The above solutions are described in the context of TDD operation, but are also fully operational in an FDD network. However, in a FDD network there may be a slightly longer recovery of traffic after the host BTS 24 listens to its neighbor BTSs 26. For example, a SS's DL received signal level estimation may need some additional integration time, but this is seen to be a fairly minimal impact. Interference estimation may also be momentarily inaccurate due to a BTS that does not transmit for a frame (or a few frames) while it instead listens for neighbor preambles.

While described in the context of WiMAX and 3GPP, it is within the scope of the exemplary embodiments of this invention to use the above described synchronization maintenance procedures for other types of wireless communication systems, such as GSM, UTRAN-LTE (E-UTRAN), and other such systems that rely upon synchronization to avoid interference among neighbor BTSs.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Various modifications and adaptations may become apparent to those skilled in the relevant arts in view of the foregoing description, when read in conjunction with the accompanying drawings. However, any and all modifications of the teachings of this invention will still fall within the scope of the non-limiting embodiments of this invention.

Furthermore, some of the features of the various non-limiting embodiments of this invention may be used to advantage without the corresponding use of other features. As such, the foregoing description should be considered as merely illustrative of the principles, teachings and exemplary embodiments of this invention, and not in limitation thereof.

I claim:

1. A method comprising:
   determining at a host network node that synchronization from a primary source is no longer reliable;
   in response to the determining that synchronization from the primary source is no longer reliable:
      deriving at the host network node a reference timing signal from a physical layer training signal received from a neighbor network node, wherein the physical layer training signal is a preamble of at least one radio frame from the neighbor network node; and
      synchronizing downlink transmissions to the derived reference timing signal, wherein synchronizing downlink transmissions to the derived reference timing signal comprises causing a phase locked loop of an internal reference oscillator of the host network node to track to the preamble received from the neighbor network node.

2. The method of claim 1, wherein synchronizing downlink transmissions comprises synchronizing all timing of a transceiver to the internal reference oscillator.

3. The method of claim 1, wherein the host network node comprises a host base station and the neighbor network node comprises a neighbor base station, and wherein the physical layer training signal is received during a time the host base station is scheduled for a downlink transmission.

4. The method of claim 1, wherein the reference timing signal is derived from preambles of radio frames of a plurality of neighbor network nodes.

5. The method of claim 1, wherein the reference timing signal is derived from a plurality of preambles of a plurality of radio frames received from the neighbor network node and averaged.

6. The method of claim 1, further comprising selecting the neighbor network node from among a plurality of network nodes based on signal quality.

7. The method of claim 1, further comprising selecting the neighbor network node from among a plurality of network nodes based on speed of an oscillator of the selected neighbor network node as determined by comparing physical layer training signals of the plurality of network nodes.

8. The method of claim 1, wherein tracking comprises compensating phase error in the phase locked loop only when the phase error exceeds a predetermined threshold.

9. The method of claim 1, further comprising:
   determining a listening slot from an identifier of the host network node; and
   synchronizing additional downlink transmissions to an additional reference timing signal derived from an additional preamble of an additional at least one radio frame received from the neighbor network node during the determined listening slot.

10. The method of claim 1, further comprising, at the host network node, recording timing phase of the preamble and wherein deriving further comprises deriving at the host network node the reference timing signal from the recorded timing phases synchronizing downlink transmissions to the derived reference timing signal, wherein synchronizing downlink transmissions to the derived reference timing signal comprises causing the phase locked loop of the internal reference oscillator of the host network node to track to the derived reference timing signal.

11. The method of claim 10, wherein recording comprises recording a plurality of timing phases of preambles for a plurality radio frames of a plurality of neighbor network nodes, and deriving further comprises selecting a reference network neighbor node whose signal level is sufficient, low-pass-filtering the stored timing phases for the selected reference network node, and deriving the reference timing signal using the filtered stored timing phases.

12. An apparatus comprising:
a receiver adapted to receive a physical layer training signal from a neighbor network node;
a processor adapted to determine that synchronization of the apparatus from a primary source is no longer reliable and, in response to the determination that synchronization of the apparatus from a primary source is no longer reliable, derive a reference timing signal from the received physical layer training signal, wherein the physical layer training signal comprises a preamble of at least one radio frame from the neighbor network node, and the apparatus further comprises a reference oscillator having a phase locked loop adapted to track the reference timing signal; and
a transmitter adapted to send downlink transmissions synchronized to the derived reference timing signal.

13. The apparatus of claim 12, wherein the transmitter and receiver are synchronized to the reference oscillator.

14. The apparatus of claim 12, wherein the apparatus comprises a host base station and the neighbor network node comprises a neighbor base station, and wherein the physical layer training signal is received from the neighbor base station during a time the host base station is scheduled for a downlink transmission.

15. The apparatus of claim 12, wherein the receiver is adapted to receive a plurality of preambles of radio frames from a plurality of neighbor network nodes and the processor is adapted to derive the reference timing signal from the plurality of received physical layer training signals.

16. The apparatus of claim 12, wherein the receiver is adapted to receive a plurality of preambles from a plurality of radio frames from the neighbor network node and the processor is adapted to derive the reference timing signal by averaging a timing reference of the plurality of preambles.

17. The apparatus of claim 12, wherein the processor is adapted to select the neighbor network node from among a plurality of network nodes based on signal quality of received physical layer training signals.

18. The apparatus of claim 12, wherein the processor is adapted to select the neighbor network node from among a plurality of network nodes based on speed of an oscillator of the selected neighbor network node as determined by comparing received physical layer training signals of the plurality of network nodes.

19. The apparatus of claim 12, wherein the phase locked loop is adapted to track the reference timing signal only when phase error in the phase locked loop exceeds a predetermined threshold.

20. The apparatus of claim 12, wherein the processor is adapted to determine a listening slot from an identifier of the host network node, and to derive an additional reference timing signal from an additional preamble of an additional at least one radio frame received from the neighbor network node during the determined listening slot.

21. A computer readable memory embodying a program of machine-readable instructions executable by a digital data processor to perform actions directed toward synchronizing with a network, the actions comprising:
determining at a host network node that synchronization from a primary source is no longer reliable;
in response to the determining that synchronization from the primary source is no longer reliable:
deriving a reference timing signal from a physical layer training signal received from a neighbor network node, wherein the physical layer training signal comprises a preamble of at least one radio frame from the neighbor network node; and
synchronizing downlink transmissions to the derived reference timing signal, wherein synchronizing downlink transmissions to the derived reference timing signal comprises causing a phase locked loop of an internal reference oscillator of the host network node to track to the preamble received from the neighbor network node.

22. The computer readable memory of claim 21, wherein synchronizing downlink transmissions comprises synchronizing all timing of a transceiver to the internal reference oscillator.

23. The computer readable memory of claim 21, wherein the physical layer training signal from the neighbor network node is received during a time the host network node is scheduled for a downlink transmission.

24. The computer readable memory of claim 21, wherein synchronizing downlink transmissions to the derived reference timing signal comprises compensating phase error in the phase locked loop only when the phase error exceeds a predetermined threshold.

25. An apparatus comprising:
at least one processor; and
at least one memory including computer program code,
the at least one memory and the computer program code configured to, with the at least one processor, cause the apparatus to perform at least the following:
determining at a host network node that synchronization from a primary source is no longer reliable;
in response to the determining that synchronization from the primary source is no longer reliable:
deriving at the host network node a reference timing signal from a physical layer training signal received from a neighbor network node, wherein the physical layer training signal is a preamble of at least one radio frame from the neighbor network node; and
synchronizing downlink transmissions to the derived reference timing signal, wherein synchronizing downlink transmissions to the derived reference timing signal comprises tracking a phase locked loop of an internal reference oscillator of the host network node to the preamble received from the neighbor network node.

26. The apparatus of claim 25, wherein the apparatus comprises a host base station comprising the at least one processor and at least one memory, and the neighbor network node comprises a neighbor base station, and wherein the physical layer training signal is received during a time the host base station is scheduled for a downlink transmission.

27. The apparatus of claim 25, wherein the reference timing signal is derived from preambles of radio frames of a plurality of neighbor network nodes.

28. The apparatus of claim 25, wherein the reference timing signal is derived from a plurality of preambles of a plurality of radio frames received from the neighbor network node and averaged.

29. The apparatus of claim 25, wherein the at least one memory and the computer program code are further configured to, with the at least one processor, cause the apparatus to perform the following: selecting the neighbor network node from among a plurality of network nodes based on signal quality.

30. The apparatus of claim 25, wherein the at least one memory and the computer program code are further configured to, with the at least one processor, cause the apparatus to perform the following: selecting the neighbor network node from among a plurality of network nodes based on speed of an oscillator of the selected neighbor network node as determined by comparing physical layer training signals of the plurality of network nodes.

* * * * *